US009686383B2

(12) United States Patent
Zhou et al.

(10) Patent No.: US 9,686,383 B2
(45) Date of Patent: *Jun. 20, 2017

(54) SYNCHRONIZATION OF TRAFFIC MULTIPLEXING IN LINK AGGREGATION

(71) Applicant: Cisco Technology, Inc., San Jose, CA (US)

(72) Inventors: Yuchen Zhou, Tiburon, CA (US); Richard Stewart, Boston, MA (US); Alex Tsai, Cupertino, CA (US); Yibin Yang, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/985,146

(22) Filed: Dec. 30, 2015

(65) Prior Publication Data

US 2016/0112549 A1    Apr. 21, 2016

Related U.S. Application Data

(63) Continuation of application No. 13/458,838, filed on Apr. 27, 2012, now Pat. No. 9,270,579.

(51) Int. Cl.
*G01R 31/08* (2006.01)
*G06F 11/00* (2006.01)
(Continued)

(52) U.S. Cl.
CPC .............. *H04L 69/28* (2013.01); *H04L 45/02* (2013.01); *H04L 45/24* (2013.01); *H04L 45/245* (2013.01); *H04L 69/14* (2013.01); *Y02B 60/33* (2013.01)

(58) Field of Classification Search
CPC ......... H04L 69/28; H04L 45/02; H04L 45/24; H04L 45/245; Y02B 60/33
See application file for complete search history.

(56) References Cited

U.S. PATENT DOCUMENTS 5,959,968 A    9/1999   Chin et al.
6,094,684 A    7/2000   Pallmann
(Continued)

FOREIGN PATENT DOCUMENTS

WO    WO 2012/028012    3/2012

OTHER PUBLICATIONS

European Patent Office, "Search Report" in application No. PCT/2013/033811, dated Jul. 19, 2013, 8 pages.
(Continued)

*Primary Examiner* — Lonnie Sweet
(74) *Attorney, Agent, or Firm* — Hickman Palermo Becker Bingham LLP; Malgorzata A. Kulczycka

(57) ABSTRACT

Synchronization of traffic multiplexing in link aggregation is described. In an embodiment, a first link aggregator and a second link aggregator are associated with a plurality of links. The first link aggregator maintains an identifier for each link indicating at least a state of enabled or disabled. A synchronized clock is established between the first link aggregator and the second link aggregator. A particular link of the plurality of links is transitioned. Wherein, the transitioning is performed by the first link aggregator sending, to the second link aggregator, a first message identifying a particular time to transition the particular link. The first link aggregator receives, from the second link aggregator, a second message indicating that the particular time is acceptable. In response to a determination that the second message indicates that the particular time is acceptable and that the synchronized clock has reached the particular time, transitioning the link.

19 Claims, 5 Drawing Sheets

(51) Int. Cl.

| | |
|---|---|
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 29/06* | (2006.01) |
| *H04L 12/707* | (2013.01) |
| *H04L 12/709* | (2013.01) |
| *H04L 12/751* | (2013.01) |

(56) References Cited

U.S. PATENT DOCUMENTS

| | | | |
|---|---|---|---|
| 7,212,543 B1 * | 5/2007 | Arwald | H04M 7/12 |
| | | | 370/466 |
| 8,520,679 B1 | 8/2013 | Williams et al. | |
| 8,724,456 B1 * | 5/2014 | Hong | G06F 11/00 |
| | | | 370/225 |
| 9,270,579 B2 * | 2/2016 | Zhou | H04L 45/245 |
| 2006/0072471 A1 | 4/2006 | Shiozawa | |
| 2008/0089236 A1 * | 4/2008 | Kotrla | H04L 12/14 |
| | | | 370/242 |
| 2008/0232389 A1 | 9/2008 | Wu et al. | |
| 2010/0265919 A1 * | 10/2010 | Ma | H04W 76/068 |
| | | | 370/332 |
| 2013/0003559 A1 | 1/2013 | Matthews | |

OTHER PUBLICATIONS

Current Claims in application No. PCT/2013/033811, dated Jul. 2013, 5 pages.

\* cited by examiner

SYNCHRONIZATION OF TRAFFIC MULTIPLEXING IN LINK AGGREGATION

TECHNICAL FIELD

The present disclosure generally relates to link aggregation in data communications networks that consist of nodes coupled by links.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Generally, link aggregation is a process of combining multiple network connections (known as links) in parallel to increase data throughput beyond what a single link could sustain, or to introduce redundancy for protection in case of link failures. As a result, the multiple aggregated links may function as though they were a single link within the network topology. Each aggregated link may represent physical links of a network, such as a power line or wireless connections, or virtual links of a network.

Consequently, link aggregation can take place at many different layers within the seven layer OSI model of computer networking. At layer 2, otherwise known as the data link layer, aggregation can occur between ports, virtual or physical, that transfer frames from one network device to another. In addition, at layer 4, otherwise known as the transport layer, links transferring segments, such as TCP connections, can also be aggregated.

In order to establish link aggregation between two devices of a network, both devices typically negotiate and agree upon the set of links to be aggregated. The process of negotiating the set of links is governed by an aggregation protocol. One aggregation protocol, known as Link Aggregation Control Protocol (LACP), performs link aggregation over links carrying MAC frames of the data link layer. LACP is described in a document entitled "IEEE Standard for Local and Metropolitan Area Networks—Link Aggregation," authored by the IEEE Computer Society, the entire contents of which is hereby incorporated by reference for all purposes as if fully set forth herein. Another aggregation protocol, known as Port Aggregation Protocol (PAgP), performs link aggregation over a set of physical or virtual ports connecting two or more network devices. PAgP is described in a document entitled "Port Aggregation Protocol", authored by Cisco Systems, Inc., San Jose, Calif., the entire contents of which is hereby incorporated by reference for all purposes as if fully set forth herein.

SUMMARY OF THE INVENTION

The appended claims may serve as a summary of the invention.

DESCRIPTION OF EXAMPLE EMBODIMENTS

Techniques for synchronization of traffic multiplexing in link aggregation are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
   1.0 General Overview
      1.1 Example Network
      1.2 Link Aggregation
   2.0 Structural Overview
   3.0 Functional Overview
      3.1 Synchronization Initiator
      3.2 Synchronization Responder
   4.0 Link Aggregation Control Protocol Example
   5.0 Implementation Mechanisms—Hardware Overview
   6.0 Extensions and Alternatives
   1.0 Overview Synchronization of traffic multiplexing in link aggregation is described. In an embodiment, a first link aggregator and a second link aggregator are associated with a plurality of links. The first link aggregator maintains an identifier for each link indicating at least a state of enabled or disabled. A synchronized clock is established between the first link aggregator and the second link aggregator. A particular link of the plurality of links is transitioned. The transitioning is performed by the first link aggregator sending, to the second link aggregator, a first message identifying a particular time to transition the particular link. The first link aggregator receives, from the second link aggregator, a second message indicating that the particular time is acceptable. In response to a determination that the second message indicates that the particular time is acceptable and that the synchronized clock has reached the particular time, transitioning the link.

In other embodiments, the invention encompasses a computer apparatus and a computer-readable medium configured to carry out the foregoing steps.

1.1 Example Network

Figure 1:
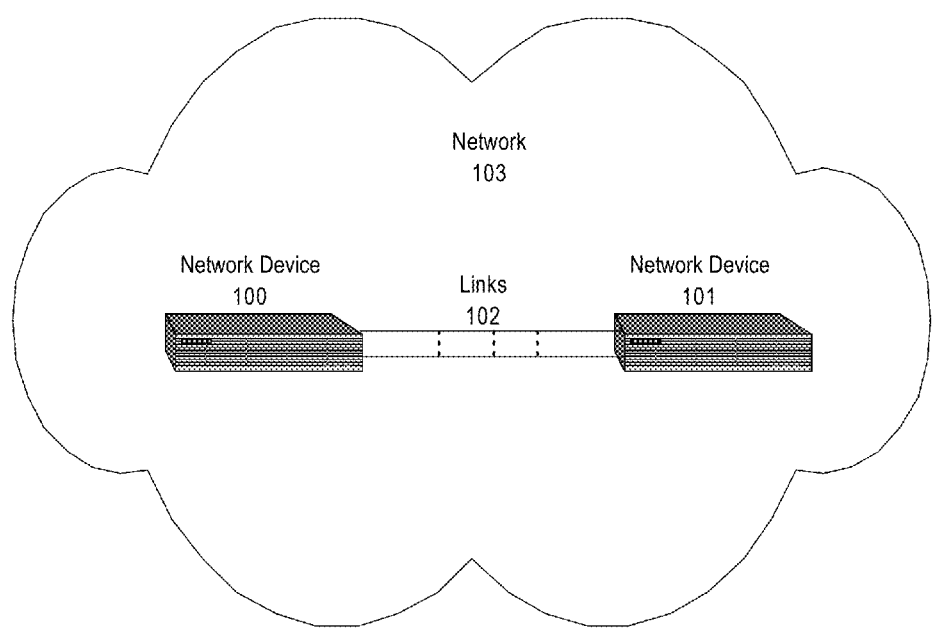
FIG. 1 illustrates two network devices upon which an embodiment may perform link aggregation.

FIG. 1 illustrates two network devices upon which an embodiment may perform link aggregation. In FIG. 1, network device 100 and network device 101 are connected through links 102. In addition, both network device 100 and network device 101 are part of network 103. Although only network devices 100, 101 are depicted in FIG. 1, network 103 may contain numerous other links and network devices that are not shown in FIG. 1.

In an embodiment, network device 100 and network device 101 are switches responsible for routing traffic through network 103. In other embodiments, network devices 100, 101 represent routers, gateways, firewalls, servers, clients, or any other type of device that can be included within network 103.

In an embodiment, the links are physical links such as wireless or Ethernet links connecting network device 100 and network device 101. In other embodiments, the links are virtual links. Meaning, there may be physical devices residing between network device 100 and network device 101 that are not depicted in FIG. 1.

1.2 Link Aggregation

In some embodiments, network devices 100, 101 use an aggregation protocol, such as LACP or PAgP, to negotiate and establish sets of links capable of aggregation. In some embodiments, the aggregation protocol divides the links 102 into one or more Link Aggregation Groups (LAGs), where each LAG functions as a single link within the topology of network 103.

However, not all links are capable of grouping in the same LAG. In some embodiments, the links themselves are incompatible. For example, a network device may only be capable of aggregating links whose ports reside on the same circuit board or links that transfer traffic at the same speed.

In other embodiments, each LAG is associated with settings that control the properties of the links within the LAG. For example, the settings may include a maximum number of links, a quality of service for the links, or a link security policy. As a result, links which are physically capable of aggregation may still be barred from participating within the same LAG if participation would violate the settings.

In some embodiments, after the initial establishment of the LAGs, network device 100 and network device 101 renegotiate the LAGs and, as a result, rearrange the associations between the links 102 and the LAGs. For example, the settings associated with one or more LAGs may be modified. In response, the aggregation protocol renegotiates and adapts the LAGs to adhere to the new settings. As another example, the links between network device 100 and network device 101 may change over time. Some links may malfunction or be removed, and others may be repaired or added. As a result, the LAGs are rearranged to compensate or optimize for the addition of new links or the removal of existing links.

Traffic assigned to the LAG is divided among the links within the LAG. The policy that dictates how to divide traffic among the links within a LAG can be based on many different factors. In some embodiments, the traffic is divided based on source or destination address. For example, the source or destination address of a frame can be hashed with a hash function with the result determining which link transports the frame. In other embodiments, the traffic is divided among the links within a LAG in round robin fashion. However, the exact policy an embodiment chooses to implement is not critical for the techniques described herein.

In some embodiments, only a subset of the links within the LAG is actively used to transport traffic. The rest of the links, known as standby links, are kept in reserve in case an active link fails. Once link failure is detected, the standby links are substituted in for the failed links in order to maintain the network connection.

When a link is added to a LAG group or transitioned from a standby link to an active link, both network device 100 and network device 101 must bring the link online before the link can be utilized. In an embodiment, a network device brings a link online when the network device enables both collection and distribution on the link. In such embodiments, collection and distribution on a link may be coupled together such that enabling one means enabling the other and vice versa. However, in other embodiments, the network device is capable of enabling collection and distribution on a link independently. As a result, network device 100 and network device 101 can bring each direction of the link online separately. For example, if network device 100 enables distribution on a link and network device 101 enables collection on the same link, a unidirectional link from network device 100 to network device 101 has been brought online by both devices.

In some circumstances, one network device, for example network device 100, may bring the link online faster than the other. Consequently, in the example above, network device 100 enables distribution on the link and begins to transmit frames before network device 101 has enabled collection on the link. As a result, the frames distributed by network device 100 are dropped until network device 101 enables collection on the link.

A similar issue also occurs when a link is removed from a LAG group or transferred from an active state to a standby state. For example, if network device 100 disables collection on a link before network device 101 disables distribution, traffic passing over the link from network device 101 to network device 100 will be dropped.

For the purposes of illustrating clear example embodiments, "transitioning" a link may include bringing a link online from an offline state and the converse.

In an embodiment, link transition is synchronized between network device 100 and network device 101. This synchronization ensures that when a network device transitions a link on its end, the network device on the other side of the link also makes the same transition at virtually the same time. As a result, traffic loss due to the delay between one network device transitioning the link before the other is eliminated or minimized.

2.0 Structural Overview

For the purpose of explanation, techniques will be described with reference to the data link layer. As such, the links will be described as transferring frames. However, the techniques described herein are not limited to aggregating links that transfer data link layer traffic. In other embodiments, the links may transfer messages adhering to any number of different standards or protocols, such as Internet Protocol (IP) or Multiprotocol Label Switching (MPLS).

Figure 2:
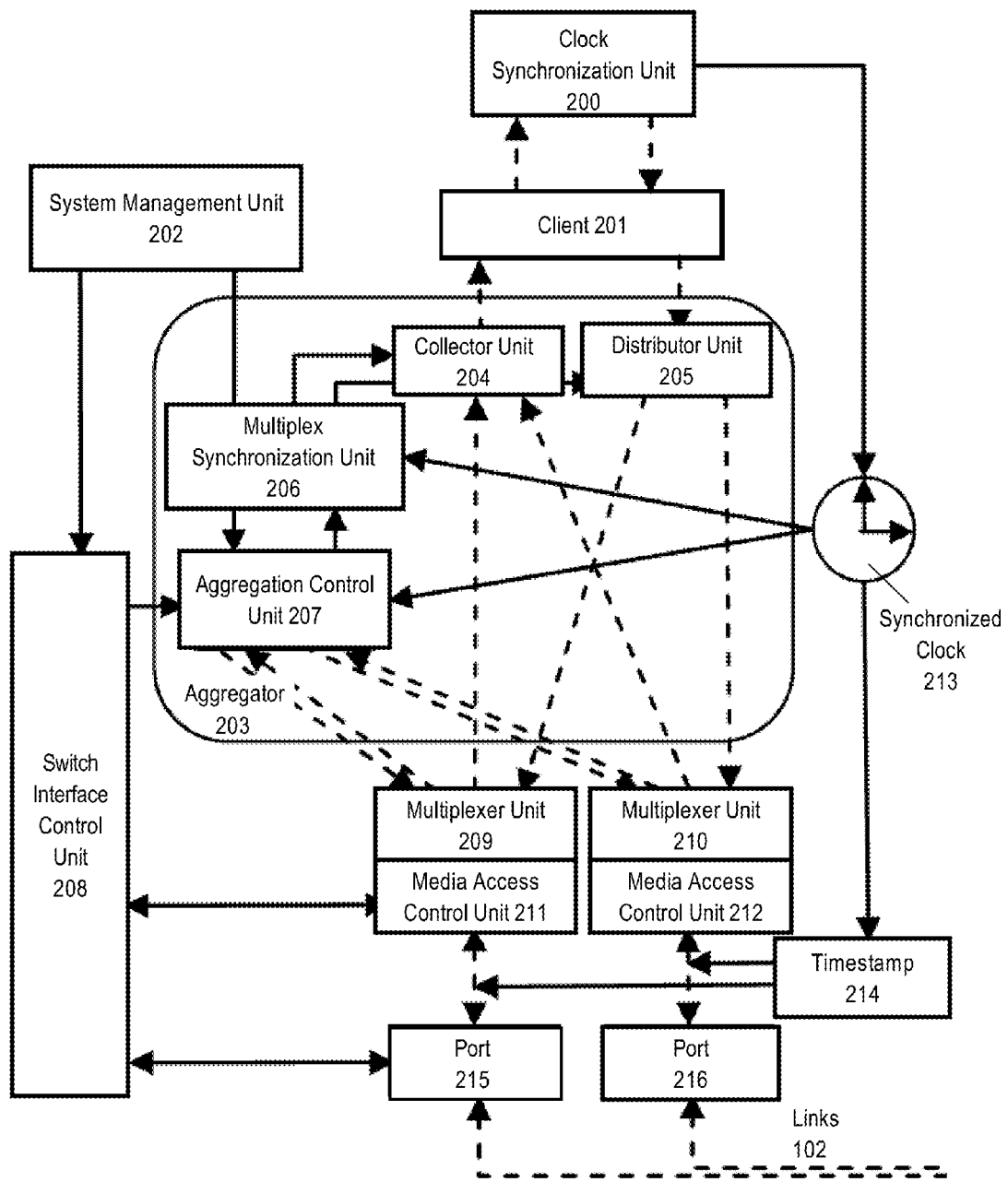
FIG. 2 illustrates an embodiment of a link aggregation design for a network device that can synchronize link transitions.

FIG. 2 illustrates an embodiment of a link aggregation design for a network device that can synchronize link transitions. For the purposes of explanation, it will be assumed that the link aggregation design of FIG. 2 has been implemented on both network device 100 and network device 101. However, in other embodiments, the link aggregation design of network device 100 can differ from the link aggregation design network device 101. A "link aggregation design," in this context, refers to any combination of computing devices, logical devices, software elements, firmware elements, or hardware elements that can be configured as seen in FIG. 2 and arranged to perform the functions that are described herein.

Frames arriving from links 102 arrive at port 215 or port 216, depending on the particular link that transmitted the frame. In some embodiments, ports 215, 216 are physical ports. However, in other embodiments, ports 215, 216 can be virtual ports. In such embodiments, the same link may connect to multiple virtual ports. Frames pass through ports 215, 216, to corresponding media access control (MAC) units 211, 212 that are configured to provide addressing and channel access control mechanisms for the frames. Once a frame has been processed by MAC unit 211 or MAC unit 212, a corresponding multiplexer unit, from among multiplexer unit 209 or multiplexer unit 210, forwards the frame to the component of aggregator 203 that is the intended recipient of the frame, such as collector unit 204 or aggregation control unit 207. In an embodiment, the intended recipient of a frame is determined by a field contained within the header of the frame, such as a Type-Length-Value (TLV) field or a flag.

Aggregator 203 aggregates frames arriving from multiplexer units 209, 210 and comprises a collector unit 204, a distributor unit 205, a multiplex synchronization unit 206, and an aggregation control unit 207.

Collector unit 204 collects frames forwarded to it by multiplexer units 209, 210 then provides those frames to client 201. In some embodiments, client 201 is a MAC unit that provides addressing and channel access control mechanisms for frames entering and leaving the aggregator.

Distributor unit 205 receives frames from client 201 and distributes those frames to multiplexer units 209, 210 for transport across the links 102. Each distributed frame is processed by the MAC unit 211 or MAC unit 212 and passed through the port 215 or port 216 corresponding to the multiplexer unit that received the frame. In some embodiments, the distributor unit 205 determines which multiplexer unit, and thus which link, should transport a frame based on a link distribution policy maintained by the aggregation control unit 207. In an embodiment, the distribution policy is represented by a set of shared state variables stored in a memory area shared between distributor unit 205 and aggregation control unit 207.

Multiplex synchronization unit 206 controls which links are enabled for collector unit 204 and distributor unit 205. In an embodiment, multiplex synchronization unit 206 controls collector unit 204 and distributor unit 205 through a set of shared state variables stored in a memory area shared between the units. However, in other embodiments, the multiplex synchronization unit 206 can control the collector unit 204 and distributor unit 205 by sending link control frames to collector unit 204 and distributor unit 205 indicating the enabled or disabled links.

In addition, multiplex synchronization unit 206 coordinates link transitions with the network device at the other end of the links 102. Consequently, multiplex synchronization unit 206 can cause distributor unit 205 to send synchronization control frames across the links 102 to the other network device. Similarly, synchronization control frames that are received by multiplexer unit 209 and multiplexer unit 210 are forwarded to the multiplex synchronization unit 206 for processing. In some embodiments, multiplexer unit 209 and multiplexer unit 210 forward the synchronization control frame directly to the multiplex synchronization unit 206. However, in other embodiments, the forwarding can be performed indirectly such as through aggregation control unit 207.

Aggregation control unit 207 manages the policy by which the links 102 are divided into LAGs and the policy by which frames are distributed among the links within a LAG. Aggregation control unit 207 is configured to receive instructions from system management unit 202 and switch interface control unit 208 that modify the policies by changing settings associated with aggregation control unit 207. For example, system management unit 202 may be a command line or graphical user interface that allows a user to manipulate the settings of aggregation control unit 207.

In addition, aggregation control unit 207 coordinates the establishment and maintenance of the LAGs with the network device on the other end of links 102. Consequently, aggregation control unit 207 can cause the distributor unit 205 to send aggregation control frames to the other network device. By the same token, aggregation control frames received by multiplexer unit 209 or multiplexer unit 210 are forwarded to aggregation control unit 207 for processing.

Furthermore, aggregation control unit 207 can determine when a link should be transitioned. The determination may be based on many factors, including the settings associated with aggregation control unit 207, modifications to the settings, changes to link connectivity, and/or communications with the other network device. In order to transition the link, aggregation control unit 207 utilizes multiplex synchronization unit 206 to synchronize the transition with the network device at the other end of the link.

Switch interface control unit 208, is an interface that is configured to allow the system management unit 202 to control aggregation control unit 207, MAC units 211, 212, and ports 215, 216. As a result, system management unit 202 can manipulate settings related to the above described components, such as settings that will modify the policies of aggregation control unit 207 or the addressing and media access mechanisms of MAC units 211, 212.

Clock synchronization unit 200 establishes and maintains a synchronized clock 213 with the network device on the other side of the links 102. The synchronized clock 213 is used to produce timestamp 214 which can be inserted into frames passing between MAC units 211, 212 and ports 215, 216. Furthermore, the synchronize clock 213 provides system time to multiplexer unit synchronization unit 206 and aggregation control unit 207.

In the illustrated embodiment, for purposes of illustrating a clear example, only a particular number of each component are depicted within FIG. 2; however, the techniques described herein are not limited to the number of each component that is depicted. For example, an embodiment may maintain multiple aggregators, where each aggregator represents a different LAG. In addition, the embodiment depicts only two links; however, the techniques described herein can be applied to link aggregation over any arbitrary number of links, including very large numbers of links.

3.0 Functional Overview

Figure 3:
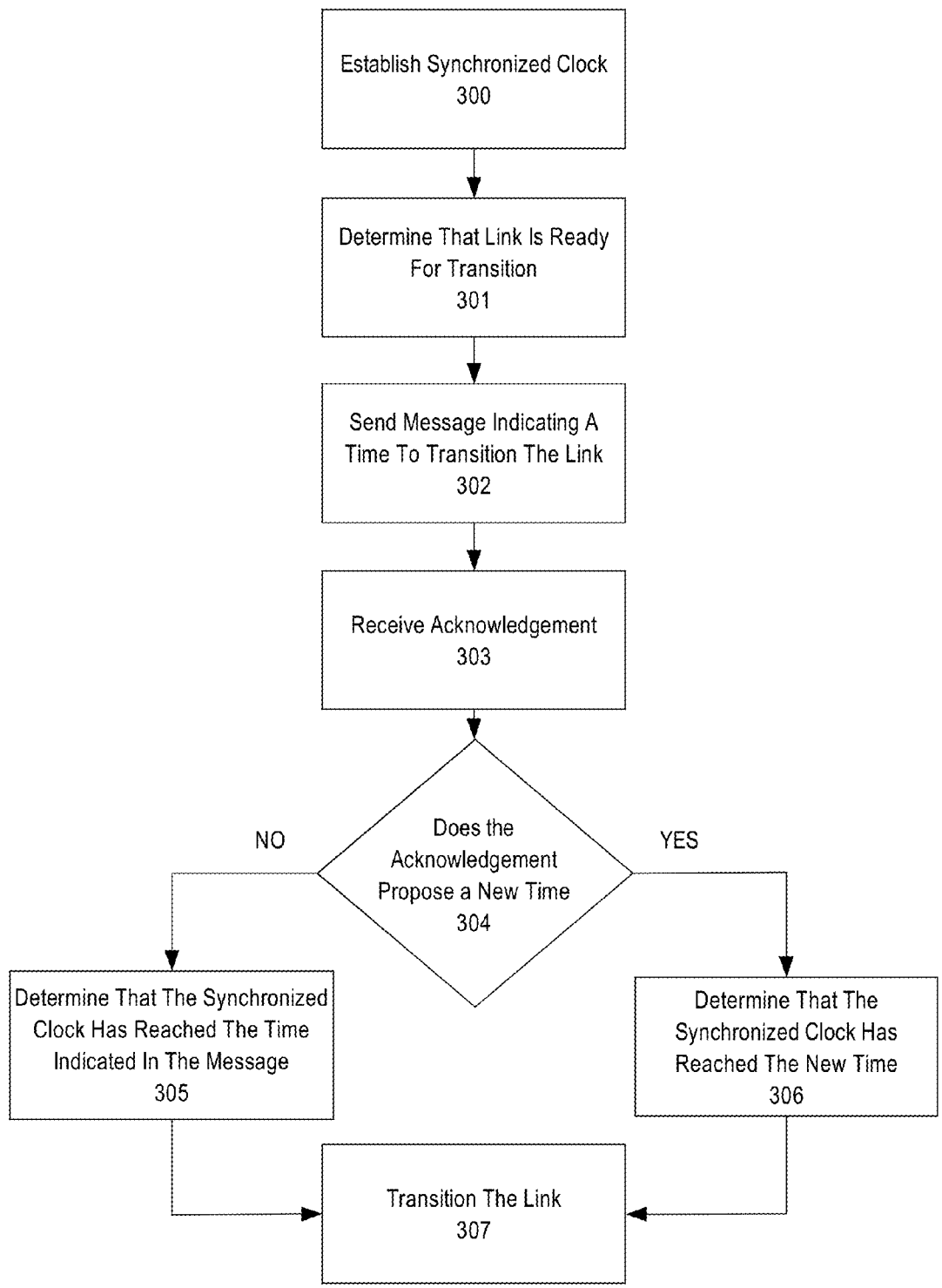
FIG. 3 illustrates an embodiment of a network device that initiates link transition synchronization in state diagram form.
Figure 4:
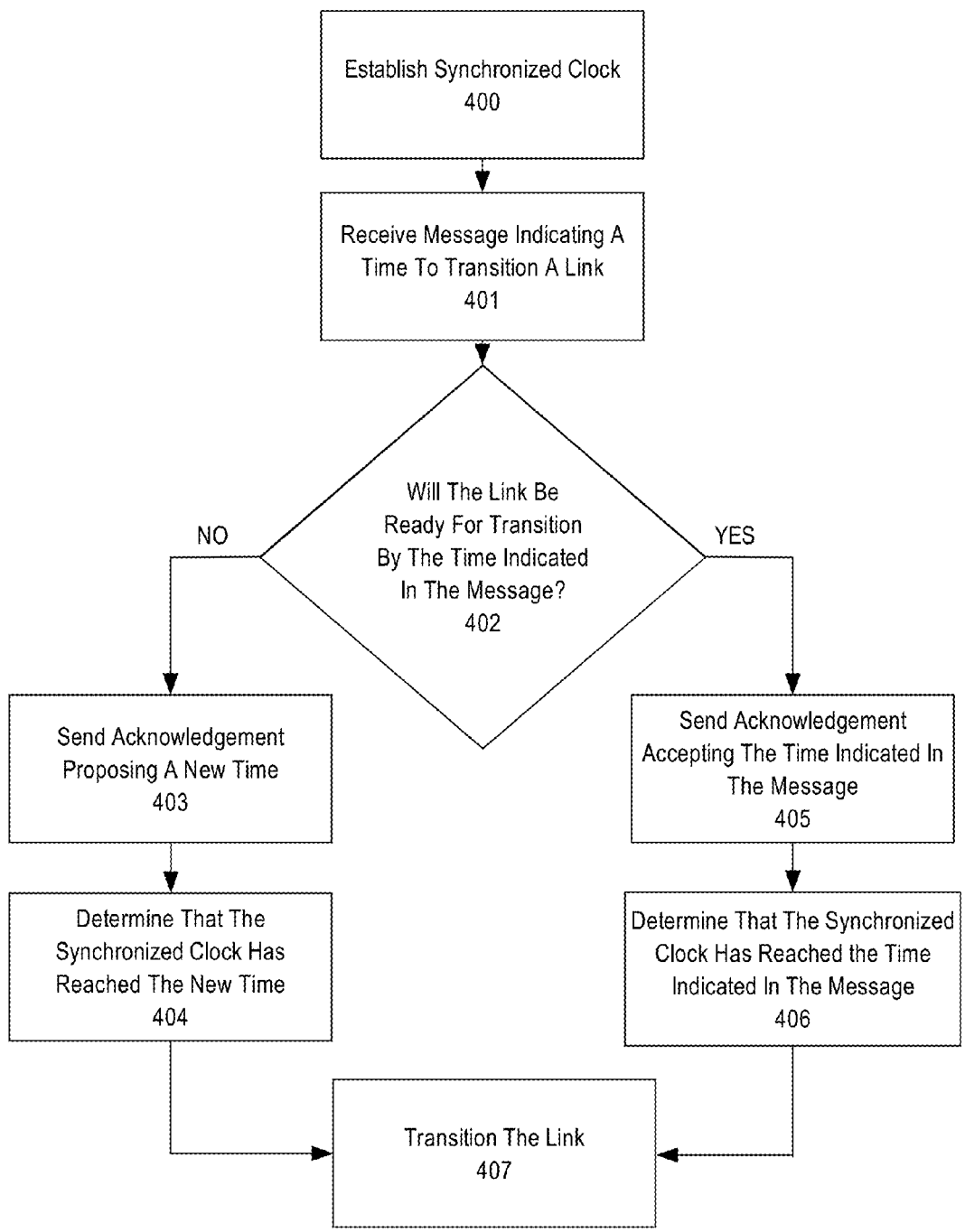
FIG. 4 illustrates an embodiment of a network device that responds to a link transition synchronization initiated by another network device in state diagram form.

FIG. 3 illustrates an embodiment of a network device that initiates link transition synchronization in state diagram form. FIG. 4 illustrates an embodiment of a network device that responds to a link transition synchronization initiated by another network device in state diagram form. For the purpose of illustrating a clear example, FIG. 3 will be represented with network device 100 and FIG. 4 will be represented by network device 101.

The choice to represent FIG. 3 with network device 100 and FIG. 4 with network device 101 is arbitrary and only intended as a means of illustration of clear examples. In some embodiments, network device 100 and network device 101 will implement both the state diagram of FIG. 3 and the state diagram of FIG. 4. In such embodiments, the network device which initiates the synchronization follows the state diagram depicted in FIG. 3 and the network device which responds to the synchronization follows the state diagram depicted in FIG. 4. Which device initiates the synchronization may be dependent on many factors including the policies of the aggregation control units of the network devices, user defined settings, and/or the relative processing power of the network devices, among others. However, which network device initiates the synchronization is not critical to the techniques described herein.

As mentioned previously, both network device 100 and network device 101 are assumed to implement the link aggregation design depicted in FIG. 2. As a result, references to FIG. 2 will be made with respect to both network device 100 and network device 101. In order to avoid confusion, reference numerals related to FIG. 2 that appear in Section 3.1 are made with respect to network device 100 and reference numerals related to FIG. 2 that appear in Section 3.2 are made with respect to network device 101.

3.1 Synchronization Initiator

Referring to FIG. 3, at block 300 network device 100 establishes a synchronized clock with network device 101. In an embodiment, the clock synchronization unit 200 establishes synchronized clock 213 with network device 101. In some embodiments, clock synchronization unit 200 implements the Precision Time Protocol (PTP) described in a document entitled, "IEEE Standard for a Precision Clock Synchronization Protocol for Networked Measurement and Control Systems," by the IEEE Instrumentation and Measurement Society, the entire contents of which is hereby incorporated by reference for all purposes as if fully set forth herein. In another embodiment, the clock synchronization unit 200 implements the Network Time Protocol (NTP), the standard for which is described in a document entitled "Network Time Protocol Version 4: Protocol and Algorithms Specification" by the Internet Engineering Task Force, the entire contents of which is hereby incorporated by reference for all purposes as if fully set forth herein. However, the exact time synchronization protocol implemented by clock synchronization unit 200 to establish synchronized clock 213 is not critical to the techniques described herein.

At block 301, network device 100 determines that a link is ready to be transitioned. In an embodiment the determination is made by aggregation control unit 207. Aggregation control unit 207 may base the determination to transition a link on a variety of different factors such as the settings associated with aggregation control unit 207, modifications to the settings, changes to link connectivity, and/or communications with network device 101. In an embodiment, after the determination is made at block 301, aggregation control unit 207 invokes multiplex synchronization unit 206 to synchronize the link transition.

At block 302, network device 100 sends a message to network device 101 indicating a time to transition the link. In an embodiment, multiplex synchronization unit 206 sends the message by generating a synchronization control frame and uses distributor unit 205 to deliver the synchronization control frame to network device 101. The time indicated by the synchronization control frame is based, at least in part, on the synchronized clock 213 established by the clock synchronization unit 200 at block 300. In some embodiments, the time indicated by the synchronization control frame is a set length of time ahead of the current time as indicated by synchronized clock 213. In an embodiment, the specific length of time is controlled by a setting managed by aggregation control unit 207. In other embodiments, the length of time is variable based on factors such as statistics gathered regarding the speed and/or workload of network device 101. In an embodiment, distributor unit 205 sends the synchronization control frame out on the same link that is to be transitioned. However, in other embodiments, the link that the synchronization control frame is sent on is governed by the policies of aggregation control unit 207.

At block 303, network device 100 receives an acknowledgement from network device 101. In an embodiment, the acknowledgement is a synchronization control frame. Consequently, when the synchronization control frame arrives at either multiplexer unit 209 or 210, that multiplexer unit forwards the synchronization control frame, directly or indirectly, to multiplex synchronization unit 206.

At block 304, network device 100 determines whether the acknowledgement proposes a new time. In an embodiment, the determination is performed by multiplex synchronization unit 206. In some embodiments, multiplex synchronization unit 206 performs the determination by checking a flag within the synchronization control frame's header. In other embodiments, the multiplex synchronization unit 206 performs the determination by checking for the existence of a particular TLV field within the frame. In still other embodiments, the multiplex synchronization unit 206 performs the determination by comparing the time proposed at block 302 to the value of a field within the synchronization control frame.

If the acknowledgement does not propose a new time, network device 100, at block 305, determines that the synchronized clock has reached the time indicated in the message sent at block 302. In an embodiment, the determination is performed by multiplex synchronization unit 206. In some embodiments, multiplex synchronization unit 206 performs the determination by periodically checking whether synchronized clock 213 has reached the time proposed in the synchronization control frame sent at block 302.

If the acknowledgment does propose a new time, network device 100, at block 306, determines that the synchronized clock has reached the time indicated in the acknowledgement received at block 303. In an embodiment, the determination is performed by multiplex synchronization unit 206. In some embodiments, multiplex synchronization unit 206 performs the determination by periodically checking whether synchronized clock 213 has reached the time proposed in the synchronization control frame received at block 303.

At block 307, network device 100 transitions the link. In an embodiment, the transition is performed by multiplex synchronization unit 206. In some embodiments, multiplex synchronization unit 206 transitions the link by manipulating an identifier configured to control whether collector unit 204 and distributor unit 205 are enabled or disabled on a given link. In an embodiment, network device 100 is able to control collector unit 204 and distributor unit 205 independently. In such embodiments, collector unit 204 and distributor unit 205 are controlled by separate identifiers. In other embodiments, control of collector unit 204 and distributor unit 205 is coupled. In such embodiments, collector unit 204 and distributor unit 205 are controlled by the same identifier.

3.2 Synchronization Responder

Referring to FIG. 4, network device 101 establishes a synchronized clock with network device 100 at block 400. In an embodiment, clock synchronization unit 200 establishes synchronized clock 213 with network device 100. In some embodiments, the clock synchronization unit implements PTP. In other embodiments the clock synchronization unit implements NTP. However, the exact time synchronization protocol implemented by clock synchronization unit 200 to establish synchronized clock 213 is not critical to the techniques described herein.

At block 401, network device 101 receives a message indicating a time to transition the link. In an embodiment, the message is a synchronization control frame. Consequently, when the synchronization control frame arrives at either multiplexer unit 209 or multiplexer unit 210, that multiplexer unit forwards the synchronization control frame to multiplex synchronization unit 206. In some embodiments, the time to transition the link is stored as a TLV within the synchronization control frame.

At block 402, network device 101 determines whether the link will be ready for transition by the time indicated in the message. In an embodiment, the determination is made by multiplex synchronization unit 206 based on the time indicated in the synchronization control frame received at block 401. The determination can be based on many factors, such as the processing power of network device 101, the current workload of network device 101, statistical analysis based on past performance, and/or the work that still has to be performed in order to ready the link for transition, among others. In some embodiments, a threshold time value is maintained for network device 402. In such embodiments, multiplex synchronization unit 206 can make the determination by comparing the difference between the time proposed by the synchronization control message and the current time as indicated by synchronized clock 213 to the threshold time value. In an embodiment, the threshold time value is a setting maintained by aggregation control unit 207 that can be manipulated by system management unit 202 and/or switch interface control unit 208.

If the link will be ready by the time indicated in the message, network device 101 sends an acknowledgment accepting the time indicated by the message at block 405. In an embodiment, multiplex synchronization unit 206 sends the acknowledgment by generating a synchronization control frame and uses distributor unit 205 to deliver the synchronization control frame to network device 100. In an embodiment, multiplex synchronization unit 206 indicates that the time is accepted by marking a flag within the synchronization control frame's header. In another embodiment, multiplex synchronization unit 206 indicates that the time is accepted by including a field, such as a TLV, with the same time received at block 401.

Next, at block 406, network device 101 determines that the synchronized clock has reached the time received at block 401. In an embodiment, the determination is performed by multiplex synchronization unit 206. In some embodiments, multiplex synchronization unit 206 performs the determination by periodically checking whether synchronized clock 213 has reached the time proposed in the synchronization control frame received at block 401.

If the link will not be ready by the time indicated in the message, network device 101 sends an acknowledgment indicating a new time at block 403. In an embodiment, the acknowledgment is sent to network device 100 using the same techniques described with relation to block 405. However, the flag will indicate that a new time is proposed and/or the field will contain a time different than the time received at block 401. In some embodiments, the time indicated in the acknowledgment is based on the threshold time value described in relation to block 402.

Next, at block 404, network device 101 determines that the synchronized clock has reached the new time sent at block 403. In an embodiment, the determination is performed by multiplex synchronization unit 206. In some embodiments, multiplex synchronization unit 206 performs the determination by periodically checking whether synchronized clock 213 has reached the time indicated by the synchronization control frame sent at block 403.

In an alternative embodiment, sending a new proposed time at block 403 is optional. For example, if network device 101 does not agree with the time proposed by network device 100, the acknowledgment, rather than proposing a new time, may only indicate that the proposed time is unacceptable. In response, link transition synchronization can be aborted and network device 100 and network device 101 will each transition the link independently.

At block 407, network device 101 transitions the link. In an embodiment, the transition is performed by multiplex synchronization unit 206. In some embodiments, multiplex synchronization unit 206 transitions the link by manipulating an identifier configured to control whether collector unit 204 and distributor unit 205 are enabled or disabled on a given link. In an embodiment, network device 100 is able to control collector unit 204 and distributor unit 205 independently. In such embodiments, collector unit 204 and distributor unit 205 are controlled by separate identifiers. In other embodiments, control of collector unit 204 and distributor unit 205 is coupled. In such embodiments, collector unit 204 and distributor unit 205 are controlled by the same identifier.

4.0 Link Aggregation Control Protocol Example

For the purposes of illustrating a clear example, implementation details will be described with reference to LACP. However, the techniques described above are not limited to LACP. As such, this section serves only as an example of how the techniques discussed above can be employed to solve particular issues faced by LACP.

LACP, as mentioned above, is an aggregation protocol that performs link aggregation over links carrying MAC frames of the data link layer. The specification for LACP details two different techniques for controlling collection and distribution on a link.

The first technique, referred to as independent control, maintains a COLLECTING state and a DISTRIBUTING state. When an actor enters the COLLECTING state, the actor enables collection on the link and when the actor enters the DISTRIBUTING state, the actor enables distribution on the link. The COLLECTING state is entered first, followed by the DISTRIBUTING state once the remote actor on the other side of the link sends a message, in the form of a Link Aggregation Control Protocol Data Unit (LACPDU), indicating that the remote actor has also transitioned into the COLLECTING state. Consequently, when one actor enters the DISTRIBUTING state and begins to transmit over the link, the remote actor has already entered the COLLECTING state and is therefore prepared to receive the transmission.

However, many systems, often including legacy systems, are not configured to provide fine grained control over a link. As a result, the LACP specification details a second technique, referred to as coupled control, which maintains a COLLECTING_DISTRIBUTING state. When an actor enters the COLLECTING_DISTRIBUTING state the actor enables both collection and distribution on the link concurrently. Consequently, unlike the case of independent control, no safeguards exist to ensure that both actors are prepared to collect data on a link before distribution occurs.

Additionally, in both coupled control and independent control, LACP carries an inherent risk that when an actor drops out of the COLLECTING_DISTRIBUTING state of coupled control or the COLLECTING state of independent control, the remote actor at the other end of the link is still transmitting data due to a lack of link synchronization.

In one approach, LACP's specification describes an optional "Marker Protocol" for clearing the link before transition occurs. However, the Marker Protocol relies on the ability to independently control collection and distribution on the link and fails to address the case where the actors implement coupled control. As a result, an embodiment may implement a modified version of LACP that performs the link synchronization techniques described above prior to entering or leaving the COLLECTING_DISTRIBUTING state. Note that this scenario is only intended to illustrate a potential enhancement to the current state of LACP, but is not limited to cases where both actors implement coupled control. Consequently, other embodiments may implement a modified version of LACP that performs the link synchronization techniques described above prior to entering or leaving the DISTRIBUTING state of independent control.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
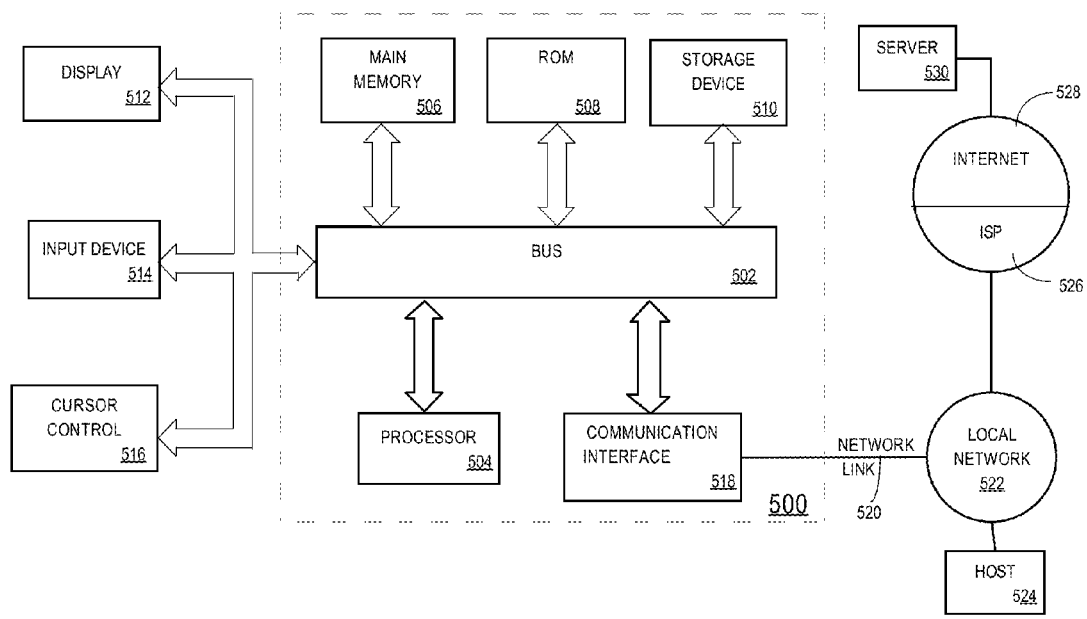
FIG. 5 illustrates a computer system upon which an embodiment could be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    associating a first link aggregator device and a second link aggregator device with a plurality of network data communication links, wherein the first link aggregator device stores an identifier for each link of the plurality of network data communication links which specifies whether the link is enabled or disabled;
    establishing a synchronized clock between the first link aggregator device and the second link aggregator device;
    transitioning a particular link of the plurality of network data communication links to a different state by:
    the first link aggregator device sending, to the second link aggregator device, a first message that identifies a particular time that indicates a future time at which the particular link should transition;
    in response to sending, to the second link aggregator device, the first message, the first link aggregator device receiving, from the second link aggregator device, a second message that indicates whether the particular time is acceptable;
    in response to determining both that the synchronized clock has reached the particular time at which the particular link should transition and that the second message indicating that the particular time is acceptable was received from the second link aggregator device, updating the identifier for the particular link to the different state.

2. The method of claim 1, further comprising associating the first link aggregator device and the second link aggregator device with a new link, wherein the new link is in a disabled state, the particular link is the new link, and the different state is enabled.

3. The method of claim 1, wherein the particular link transitions from an enabled state to a disabled state in response to removing the particular link from an association between the first link aggregator device and the second link aggregator device.

4. The method of claim 1, wherein the first link aggregator device comprises a collector unit that collects data frames arriving from the plurality of data network communication links and a distributor unit that sends out data frames that arrive from a client using the plurality of network data communication links; wherein the identifier for each individual link of the plurality of network data communication links controls whether the collector unit and the distributor unit can interact with the individual link.

5. The method of claim 1, further comprising associating one or more values with the first link aggregator device and the second link aggregator device, wherein transitioning the particular link occurs in response to a change in the one or more values, wherein the one or more values represent one or more settings associated with one or more of: the first link aggregator device or the second link aggregator device.

6. The method of claim 5, wherein the one or more values pertain to one or more of a maximum number of allowable links, a quality of service, or a link security policy.

7. A non-transitory computer-readable medium carrying one or more sequences of instructions which, when executed by one or more processors, cause the one or more processors to perform:
    associating a first link aggregator device and a second link aggregator device with a plurality of network data communication links, wherein the first link aggregator device stores an identifier for each link of the plurality of network data communication links which specifies whether the link is enabled or disabled;
    establishing a synchronized clock between the first link aggregator device and the second link aggregator device;
    transitioning a particular link of the plurality of network data communication links to a different state by:
    the first link aggregator device sending, to the second link aggregator device, a first message that identifies a particular time that indicates a future time at which the particular link should transition;
    in response to sending, to the second link aggregator device, the first message, the first link aggregator device receiving, from the second link aggregator device, a second message that indicates whether the particular time is acceptable;
    in response to determining both that the synchronized clock has reached the particular time at which the particular link should transition and that the second message indicating that the particular time is acceptable was received from the second link aggregator device, updating the identifier for the particular link to the different state.

8. The non-transitory computer-readable medium of claim 7, wherein the one or more sequences of instructions further cause the one or more processors to perform associating the first link aggregator device and the second link aggregator device with a new link, wherein the new link is in a disabled state, the particular link is the new link, and the different state is enabled.

9. The non-transitory computer-readable medium of claim 7, wherein the particular link transitions from an enabled state to a disabled state in response to removing the particular link from an association between the first link aggregator device and the second link aggregator device.

10. The non-transitory computer-readable medium of claim 7, wherein the first link aggregator device comprises a collector unit that collects data frames arriving from the plurality of data network communication links and a distributor unit that sends out data frames that arrive from a client using the plurality of network data communication links; wherein the identifier for each individual link of the plurality of network data communication links controls whether the collector unit and the distributor unit can interact with the individual link.

11. The non-transitory computer-readable medium of claim 7, wherein the one or more sequences of instructions further cause the one or more processors to perform associating one or more values with the first link aggregator device and the second link aggregator device, wherein transitioning the particular link occurs in response to a change in the one or more values, wherein the one or more values represent one or more settings associated with one or more of: the first link aggregator device or the second link aggregator device.

12. The non-transitory computer-readable medium of claim 11, wherein the one or more values pertain to one or more of a maximum number of allowable links, a quality of service, or a link security policy.

13. A computer system comprising:
one or more processors;
a memory storing one or more instructions which, when executed by the one or more processors, cause the one or more processors to perform:
associating a first link aggregator device and a second link aggregator device with a plurality of network data communication links, wherein the first link aggregator device stores an identifier for each link of the plurality of network data communication links which specifies whether the link is enabled or disabled;
establishing a synchronized clock between the first link aggregator device and the second link aggregator device;
transitioning a particular link of the plurality of network data communication links to a different state by:
the first link aggregator device sending, to the second link aggregator device, a first message that identifies a particular time that indicates a future time at which the particular link should transition;
in response to sending, to the second link aggregator device, the first message, the first link aggregator device receiving, from the second link aggregator device, a second message that indicates whether the particular time is acceptable;
in response to determining both that the synchronized clock has reached the particular time at which the particular link should transition and that the second message indicating that the particular time is acceptable was received from the second link aggregator device, updating the identifier for the particular link to the different state.

14. The system of claim 13, wherein the one or more instructions when executed by the one or more processors cause the one or more processors to further perform associating the first link aggregator device and the second link aggregator device with a new link, wherein the new link is in a disabled state, the particular link is the new link, and the different state is enabled.

15. The system of claim 13, wherein the particular link transitions from an enabled state to a disabled state in response to removing the particular link from an association between the first link aggregator device and the second link aggregator device.

16. The system of claim 13 wherein the first link aggregator device comprises a collector unit that collects data frames arriving from the plurality of data network communication links and a distributor unit that sends out data frames that arrive from a client using the plurality of network data communication links; wherein the identifier for each individual link of the plurality of network data communication links controls whether the collector unit and the distributor unit can interact with the individual link.

17. The system of claim 13, wherein the one or more instructions further cause the one or more processors to perform associating one or more values with the first link aggregator device and the second link aggregator device, wherein transitioning the particular link occurs in response to a change in the one or more values, wherein the one or more values represent one or more settings associated with one or more of: the first link aggregator device or the second link aggregator device.

18. The system of claim 17, wherein the one or more values pertain to one or more of a maximum number of allowable links, a quality of service, or a link security policy.

19. The system of claim 13, further comprising any of a packet data switch or a packet data router.

* * * * *